Oct. 6, 1964
J. M. MULDOON
3,151,752
CARGO HANDLING DEVICE
Filed Nov. 24, 1961
2 Sheets-Sheet 1
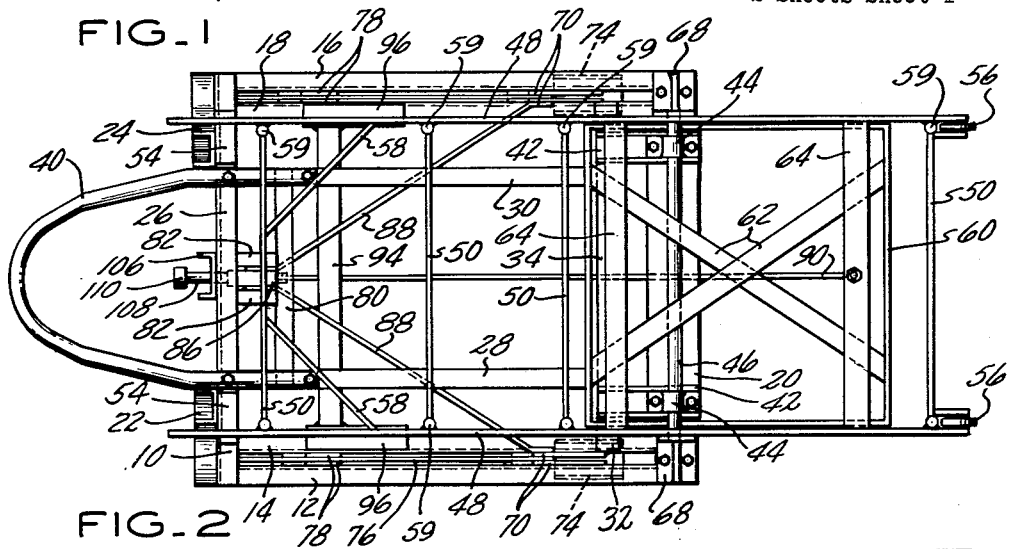
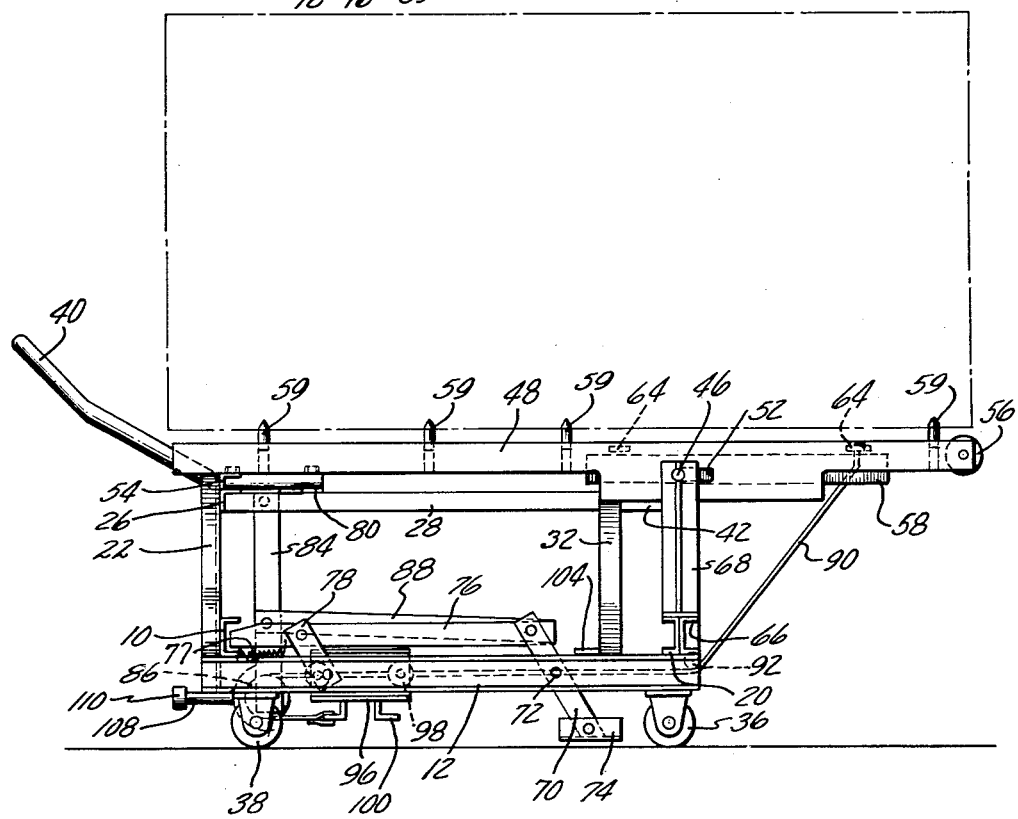
INVENTOR
JOSEPH M. MULDOON
BY *David S. Fishman*
ATTORNEY

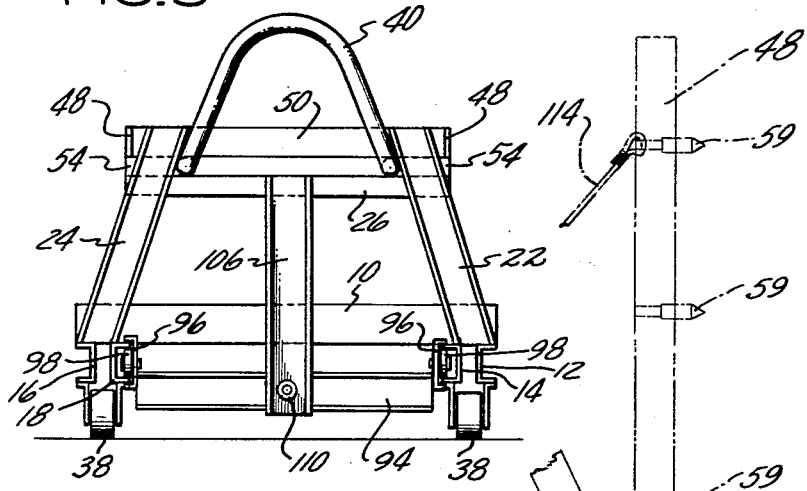
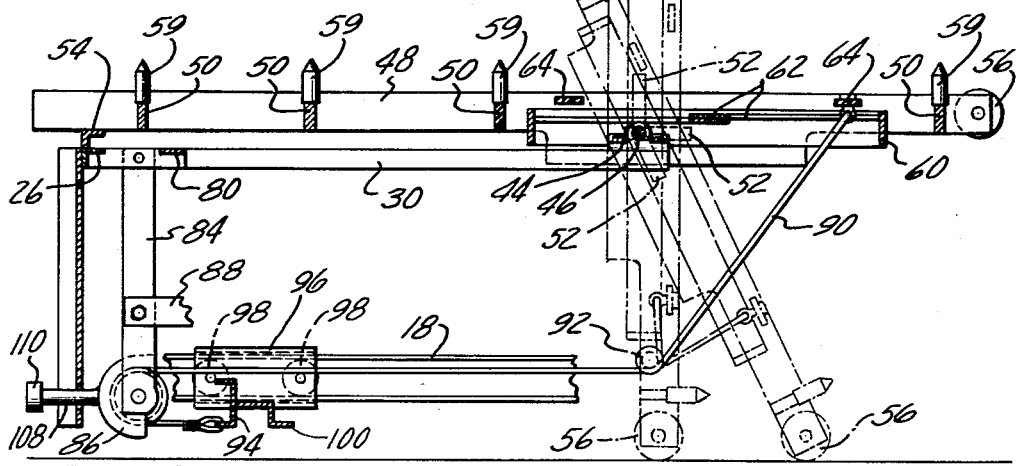
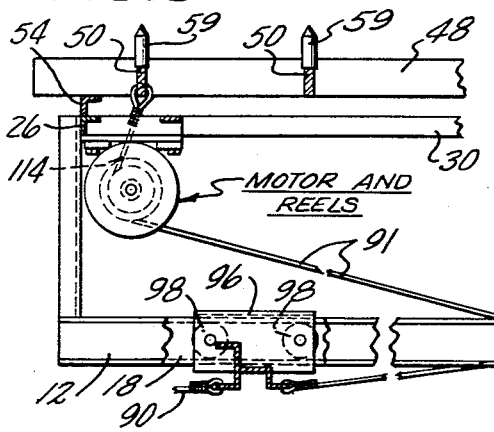
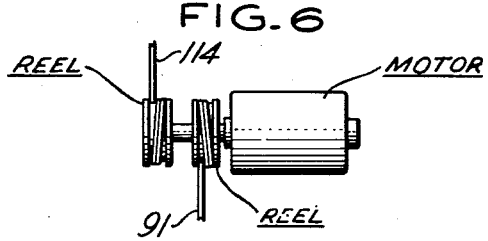

3,151,752
CARGO HANDLING DEVICE
Joseph M. Muldoon, 318 Park Terrace, Hartford, Conn.
Filed Nov. 24, 1961, Ser. No. 154,599
9 Claims. (Cl. 214—130)

This invention relates to a cargo handling device. More particularly, it relates to a mobile hand truck especially suitable for handling large, bulky and heavy cargo.

Several serious problems are presently encountered in the handling and transportation of large, bulky and heavy items such as bales of cardboard made up of used cardboard cartons. These bales are encountered in warehouse operations in which provision must be made for the disposal of large numbers of used cardboard cartons. The used cartons are compressed into the form of a rectangular block by a baling machine, and the bales weigh from twelve hundred to fifteen hundred pounds. Moving the bales from the baling machine to either a storage area or to trucks is a hazardous operation which presently involves a number of serious and dangerous problems and requires the employment of two or three men.

The bales are discharged from the baling machine at a height of several feet above the floor or ground onto a common two wheel hand truck previously positioned to receive the bale. If the hand truck has not been properly positioned, the truck may be overturned and the bale spilled to the ground; or, misalignment between the bale and the truck may result in the bale slipping when the truck is raised and moved; or, the reaction between the bale and the truck may overturn the truck and spill the bale even with a properly positioned truck. Furthermore, even when the bale is properly deposited on to the truck and transported to the unloading point, two or three men are required for tipping the bale upright to unload it off the truck. These steps in handling the heavy bales and the constant possibility of a bale slipping during movement of the truck all pose a threat to the safety and welfare of the men performing these jobs, the danger of back strain being one readily apparent danger. Furthermore, the use of several men in the moving of the truck and bale is a waste of manpower. Generally speaking, the present system of handling these bales and other items of a similar nature, such as large bales of cotton, is both uneconomical and hazardous.

The mobile hand truck of the present invention eliminates the above discussed problems and results in a hand truck which accomplishes the movement of large, heavy and bulky items both economically and without danger of injury to the operator, the hand truck of the present invention requiring only one man for operation. The present invention teaches a mobile hand truck having a pivotably mounted elevated table which is normally in a horizontal position and extends beyond the front end of the truck. In its horizontal position the table is just slightly below or level with the point at which the bale is discharged from the baling machine, and hence the bale is deposited on to the table of the hand truck without achieving a high free fall velocity. Spikes protruding upwardly from the table prevent the bale from slipping during movement of the hand truck to a discharge station for the bale. The present hand truck also incorporates a brake to immobilize the truck at any time and particularly during the unloading of the bale. To unload the truck, the brake is actuated and the table is pivoted toward the vertical. The forwardmost end of the table strikes the ground at an acute angle therewith and the weight of the bale keeps the bale on the table. The truck is then urged forward to release the brake and cause the table to slide on its pivot axis along slots in the sides of the table, thereby bringing the table to a vertical position and discharging the bale. In this manner the bale is not violently discharged from the table, and serious reactions are avoided.

Accordingly, one feature of the present invention is a novel cargo handling device which is safe and economical to operate.

Another feature of the present invention is a novel cargo handling device having an elevated normally horizontal table, the table being pivotable between the horizontal and the vertical.

Still another feature of the present invention is a novel cargo handling device having an elevated normally horizontal table, the table being capable of movement to the vertical through pivoting and sliding motion.

Still another feature of the present invention is a novel mobile hand truck having an elevated normally horizontal table pivotably and slideably mounted for movement between the horizontal and the vertical, and having brakes for immobilizing the truck.

Still another feature of the present invention is a novel mobile hand truck having an elevated normally horizontal table capable of movement between the horizontal and the vertical, and having brake means actuated in sequence with the movement of the table.

Still another feature of the present invention is a novel method of cargo handling wherein the cargo is transported on a truck having a horizontal table, brakes are applied to immobilize the truck, the table and cargo are pivoted toward the vertical to form an acute angle with the ground, and the truck is moved toward the point of contact between the table and the ground to slide the table to the vertical and unload the cargo.

Still another feature of the present invention is a novel method of handling cargo wherein the cargo is loaded on an elevated table which is pivotably mounted on a line containing its center of gravity, the center of gravity of the cargo being vertically above the center of gravity of the table, and wherein a force is applied to one end of the table to pivot it to the vertical and discharge the cargo.

Other features and advantages of the present invention will be apparent from the following descriptions and drawings wherein:

FIG. 1 is a plan view of the cargo handling device of the present invention.

FIG. 2 is a side elevation view of the cargo handling device of the present invention.

FIG. 3 is a rear plan view of the cargo handling device of the present invention.

FIG. 4 is a partial sectional view of FIG. 1 showing various positions of the table.

FIG. 5 is a view showing a modification of the device shown in FIGS. 1–4.

FIG. 6 is a showing of the motor and reels of FIG. 5.

Referring now to FIGS. 1 and 2, the hand truck has a frame of metal members joined together by welding or any other convenient method. The lower portion of the frame has a channel iron cross member 10 at the rear end of the frame. A pair of channel iron members 12 and 14 are attached to and extend from one end of member 10 to form one side of the lower portion of the frame, the webs of each channel being in spaced relation and facing each other. A similarly disposed pair of channel iron members 16 and 18 extend from the other end of member 10 to form the other side of the lower portion of the frame. At the front end of the frame a channel iron cross member 20 is attached to members 12, 14, 16, and 18 to complete a rectangular lower portion of the frame.

Still referring to FIGS. 1 and 2, members 12, 14, 16, and 18 extend slightly beyond cross member 10. A channel iron member 22 (also see FIG. 3) is attached to the web of member 10 and extends upwardly above the extensions of members 12 and 14 at an angle to the vertical. A similarly disposed channel iron member 24 extends upwardly from cross member 10 above the extensions of members 16 and 18. A cross member 26 of angle iron is attached to the webs of members 22 and 24, and angle iron members 28 and 30 are attached to cross member 26 at points removed from the ends thereof and extend toward the front of the frame. An angle iron member 32 extends upwardly at an angle to the vertical from members 12 and 14 at a point short of the front end of the frame, and a similarly disposed member extends from members 16 and 18. A cross member 34 extends between and joins the members 32, and the members 28 and 30 are attached to cross member 34 at points removed from the ends thereof.

Wheels 36 and 38 are mounted near each end of the lower portion side members to provide mobility for the truck, the rear wheels 38 being rotatable about vertical axes to steer the truck. An operator's handle 40 is bolted to upper side members 28 and 30 and upper cross member 26, to provide a convenient point for pushing the truck.

The above described structure constitutes the basic elements of the frame for the hand truck, the frame consisting of upper and lower portions joined together with the front and side parts of the upper portion being within the front and side parts of the lower portion.

Still referring to FIGS. 1 and 2, channel members 42 extend toward the front of the frame from each end of upper cross member 34. A bearing 44 is housed in each channel 42, and a pivot rod 46 is mounted in the bearings and extends past the bearings on each side of the frame. As can best be seen in FIG. 2, pivot rod 46 is raised slightly above the upper portion of the frame.

A table having side members 48 and cross members 50 is pivotably and slidably mounted on bar 46. The pivotable and slidable connection with bar 46 is achieved through the use of a slot 52 in each side member of the table, the table normally being positioned so that the bar 46 contacts the rearmost end of the slots 52. The table is normally in a horizontal position as shown in FIGS. 1 and 2, and support members 54 (see FIG. 3) are attached to and extends slightly beyond members 22 and 24 to provide a rest for the table sides. Wheels 56 are mounted at the front end of the table to form part of the table, and stiffening members 58 may be provided if desired. A plurality of spikes 59, preferable one at each end of cross members 50, are provided for firmly holding the cargo in place on the table.

A four-sided brace 60 with reinforcing struts 62 is also pivotably mounted on rod 46 within the table with two of the sides of the brace in sliding contact with the sides 48 of the table. A pair of cross members 64, one on either side of pivot rod 46, extend between the table sides 48 and contact brace 60 to prevent any relative angular displacement between the brace and the table. Brace 60 serves to prevent any canting movement of the table which might otherwise occur due to the slots 52.

A short channel piece 66 is mounted on the front end of each side of the lower portion of the frame to form a guide for the table when it is moved to the vertical. Struts 68 are attached to members 20 and 66 at each side of the frame and extend vertically upward and form retainers for pivot rod 46. As can best the seen in FIG. 1, all of the upper portion of the frame is within the sides of the table, and, hence, there are no protruding parts which might be struck by the cargo and tip the truck as the cargo is deposited onto the table.

A member 70 is pivotably mounted at 72 between the adjacent webs of side members 12 and 14. A surface engaging member 74 is pivotably connected to member 70, the members 70 and 74 forming a brake. Similar brake structure is mounted between the adjacent webs of side members 16 and 18. At both sides of the frame a connecting rod 76 extends rearwardly from member 70 and is pivotably connected between members 70 and a similar member 78 pivotably mounted between the adjacent webs of the side members like members 70. Surface engaging means may be attached to members 78 to form brakes at the rear of the frame if desired. It would also be possible to omit members 78 and rods 76, but it is preferable that they be included to stabilize the operation of the forward brakes.

Still referring to FIGS. 1 and 2, a cross member 80 extends between the upper side members 28 and 30, and a pair of supporting elements 82 extend between upper cross member 26 and cross member 80. The elements 82 pivotably support a bifurcated depending strut 84 which houses a pulley 86 at the end thereof. Connecting rod 88 is pivotably connects between strut 84 and each of the members 70, the members 84, 86, and 88 forming part of the actuating mechanism for the brakes in a manner to be described hereinafter. A normally slack, flexible member 90 such as a strong cord or wire extends from the forwardmost cross member 64, passes under a pulley or wheel 92, passes around pulley 86, and emerges from the bottom of pulley 86 to be connected to a cross member 94 having casings 96 mounted on each end containing wheels or rollers 98 which ride in the channels of side members 14 and 18. Movement of cross member 94 toward the front end of the truck results in the actuation of the brakes and the movement of the table toward the vertical. Cross member 94 can be so moved by applying an external force to it; or, for example, by mounting and pulley either at the front of the frame or as shown in FIG. 5 and connecting a strong cord or wire between the pulley and finger 100 so that the motor would drive the pulley to wind up the wire and move cross member 94. Stops 104 mounted on the lower frame side members limit the forward movement of cross member 94 by limiting the travel of slides 96.

A strut 106 (see FIG. 3) is fastened to upper cross member 26 and lower cross member 10 and extends below lower cross member 10. A rod 108 passes through a hole in struct 106 and is connected to the casing of pulley 86. Rod 108 has a head 110 which is larger than the hole in struct 106 through which the rod passes, and head 110 limits the forward movement of rod 108. Manual movement of rod 108 toward the front of the truck results in actuation of the brakes but does not pivot the table.

In the operation of the device shown in FIGS. 1–3, it is contemplated that a bale would be deposited on its back on the normally horizontal table as is shown in FIG. 2, the spikes 59 engaging the back of the bale to secure it. The operator would then push the truck to a desired location to unload the bale. To unload the bale, a force is applied to cross member 94 to move it toward the front of the frame. The initial forward movement of member 94 takes up the normal slack in wire 90 and pivots strut 84 in a counter clockwise direction until head 110 contacts strut 106. The movement of struct 84 is transmitted through connecting rods 88 to pivot members 70 and 78 in a clockwise direction and move elements 74 into engagement with the ground. Thus, the brakes are actuated to immobilize the truck. Further movement of member 94 causes wire 90 to slide over pulley 86 and results in a force being applied to the table to pivot it in a clockwise direction.

As the table moves toward the vertical, pivot rod 46 is in contact with the rearmost part of slots 52, and, as can be seen in FIG. 4, the wheels strike the ground and the table forms an acute angle with the vertical. The truck and actuating elements are so proportioned that slides 96 strike stops 104 to prevent the exertion of any further force on the table when the wheels contact the ground. An external force, such as from a pallet transporter, is then applied to the rear of the truck to push it forward; the force causes a reaction between pivot bar 46 and the table whereby the front end of the truck rises slightly, the brakes are released by the action of tension spring 77 extending between members 10 and 76 which causes counterclockwise rotation of members 70 and 78, the frame moves forward, and the table slides along rod 46 by means of slots 52, the weight of the bale preventing any forward motion of the table. Forward motion of the table when in this acute position is prevented because the center of gravity of the bale is to the right of wheels 56 so that a clockwise moment is present about wheels 56 causing the wheels to act as a pivot rather than rolling. In this manner, the table is brought to the vertical and the bale is discharged upright without encountering serious reaction forces between the bale and the truck. The table can then be manually returned to the horizontal position after removing the force from cross member 94.

Thus, it can be seen that the present invention provides a means of handling large, heavy cargo which only requires one man and which eliminates many safety hazards. In particular, the danger of back strain is eliminated because all manual lifting requirements are eliminated, and the only manual force needed is a pushing force. Furthermore, the need for any manual or external force can be entirely eliminated by motorizing the front wheels 36 in any convenient manner, or by substituting a single centrally mounted motor driven wheel for the rear wheels.

As a further feature, a flexible member 114 (see FIGS. 4 and 5), similar to flexible member 90, can be extended from one of the cross members 50 near the rear of the table to a motor actuated reel. A flexible member 91 for moving cross member 94 is attached to another reel actuated by the same motor, the members 91 and 114 being oppositely wound so that one will be unwound when the other is being wound, and vice versa (see FIG. 6). In this manner, a bale stored upright can be attached to the vertical table in any convenient fashion, and then the table and bale can be mechanically moved to the horizontal position for transportation.

It should also be observed that the structure and operation of the present hand truck can be simplified by just pivotably mounting the table on pivot rod 46, proportioning the elements of the truck so that the table moves directly to the vertical in one step, and placing the bale on the table so that the center of gravity of the bale is vertically aligned with pivot axis 46. The bale can then be discharged by applying a slight amount of force to the table to cause it to rotate in a clockwise direction. And, the operation can be further facilitated by having pivot axis 46 pass through the center of gravity of the table.

It is to be expressly understood that the present invention is not limited to the specific embodiment described and illustrated, but may be used in other ways without departing from the spirit of the following claims.

I claim:

1. A cargo handling device including a frame, a table pivotably mounted on said frame and normally in a substantially horizontal position, brake means connected to said frame, and means for actuating said brake means and said table, said actuating means including a pivotable strut depending from said frame, a rigid member connecting said strut to said brake means, a normally slack flexible member attached to and extending from said table and slidably connected to said depending strut, and means for exerting a force on said flexible member to take up the slack in said flexible member, pivot said depending strut, and slide said flexible member on said depending strut, whereby said brake means are actuated and said table is then moved toward the vertical.

2. A cargo handling device as in claim 1 including means for manually pivoting said depending strut, and means for limiting the movement of said depending strut.

3. A cargo handling device as in claim 1 including means for manaully actuating said brake means.

4. A cargo handling device as in claim 1 including means for moving said table from the vertical to the horizontal.

5. A cargo handling device including a frame, a pivot bar attached to said frame, a table having a pair of sides with an elongated slot in each side extending in end-to-end direction of the sides, said pivot bar passing through said slots and normally at one end therein, said table being normally in a horizontal position and extending beyond said frame, brake means connected to said frame, and means for sequentially actuating said brake means and said table to immobilize said cargo handling device and move said table toward the vertical.

6. A cargo handling device as in claim 5 including a brace pivotably attached to said pivot bar and within the sides of said table, said brace being in sliding contact with said table.

7. A cargo handling device including a frame, a pivot bar attached to said frame, a table having a pair of sides with an elongated slot in each side extending in end-to-end direction of the sides, said bar passing through said slots and normally at one end therein, said table being normally in a horizontal position and extending beyond the front end of said frame, a plurality of spikes extending upwardly from said table, brake means extending from said frame, a member depending downwardly from and pivotably attached to said frame, a pulley attached to said downwardly depending member, a rigid member extending between said downwardly depending member and said brake means, a flexible member attached to said table at a point beyond the end of said frame, said flexible member extending toward the back end of said frame, and means for exerting a force on said flexible member to sequentially actuate said brake means and pivot said table toward the vertical.

8. A cargo handling device as in claim 7 wherein said table extends from the pivot bar beyond the front end of said frame a distance equal to the height of said pivot bar above ground plus the length of one of said slots, whereby said table contacts the ground before reaching the vertical position.

9. A cargo handling truck as in claim 7 including a brace pivotably attached to said bar, said brace being within said table and in slidable contact therewith.

References Cited in the file of this patent

UNITED STATES PATENTS

| | | |
|---|---|---|
| 1,689,156 | Ruffner | Oct. 23, 1928 |
| 1,745,381 | Ray | Feb. 4, 1930 |
| 1,840,666 | Grundon | Jan. 12, 1932 |
| 1,983,769 | Owen | Dec. 11, 1934 |
| 2,106,573 | Moller | Jan. 25, 1938 |
| 2,715,031 | Danielsson | Aug. 9, 1955 |
| 2,926,798 | Hamilton | Mar. 1, 1960 |
| 2,929,517 | Phillips | Mar. 22, 1960 |

FOREIGN PATENTS

| | | |
|---|---|---|
| 547,688 | Germany | Apr. 2, 1932 |